US012591220B2

(12) United States Patent
McCallum et al.

(10) Patent No.: US 12,591,220 B2
(45) Date of Patent: Mar. 31, 2026

(54) SYSTEMS AND METHODS FOR USING WIRE PRINTING PROCESS DATA TO PREDICT MATERIAL PROPERTIES AND PART QUALITY

(71) Applicant: Relativity Space, Inc., Long Beach, CA (US)

(72) Inventors: Duncan McCallum, Lexington, MA (US); Salvador Barriga, Burlington, MA (US); Forrest Pieper, Watertown, MA (US); Elad Taig, Lexington, MA (US); Paul Burke, Framingham, MA (US); Kevin Cedrone, Somerville, MA (US)

(73) Assignee: Relativity Space, Inc., Long Beach, CA (US)

( * ) Notice: Subject to any disclaimer, the term of this patent is extended or adjusted under 35 U.S.C. 154(b) by 309 days.

(21) Appl. No.: 18/508,075

(22) Filed: Nov. 13, 2023

(65) Prior Publication Data

US 2024/0077849 A1     Mar. 7, 2024

Related U.S. Application Data

(63) Continuation of application No. 16/933,637, filed on Jul. 20, 2020, now Pat. No. 11,853,033.
(Continued)

(51) Int. Cl.
*B33Y 50/02*          (2015.01)
*B23K 26/342*        (2014.01)
(Continued)

(52) U.S. Cl.
CPC ........ *G05B 19/4155* (2013.01); *B23K 26/342* (2015.10); *B33Y 10/00* (2014.12);
(Continued)

(58) Field of Classification Search
CPC ...................................................... B33Y 50/02
See application file for complete search history.

(56) References Cited

U.S. PATENT DOCUMENTS

| | | |
|---|---|---|
| 3,331,545 A | 7/1967 | Olivieri |
| 3,344,305 A | 9/1967 | Ogden et al. |

(Continued)

FOREIGN PATENT DOCUMENTS

| | | |
|---|---|---|
| CN | 101733521 A | 6/2010 |
| CN | 104001918 A | 8/2014 |

(Continued)

OTHER PUBLICATIONS

Extended European Search Report for European Application No. 15867808.6, Search Completed Aug. 20, 2018, Mailed Aug. 30, 2018, 7 Pgs.
(Continued)

*Primary Examiner* — Suresh Suryawanshi
(74) *Attorney, Agent, or Firm* — KPPB LLP

(57) ABSTRACT

Disclosed herein are systems and methods for using printing process data to predict quality measures for three-dimensional (3D) printed objects and properties of the materials comprising the 3D objects. Printing may be performed using resistive or Joule printing. The system may include a computer communicatively coupled to a 3D printing apparatus, which may store printing parameters. The 3D printing apparatus may be able to take measurements during a print job, and record those measurements in memory. The 3D printing apparatus may also be able to record printing states before, during, and/or after printing. A combination of printing states, printing parameters, and measurements may be analyzed, for example, by a machine learning algorithm, in order to predict material properties and quality measures.

13 Claims, 5 Drawing Sheets

400

Obtain printing parameters and printing state
410

Print 3D object in accordance with printing parameters
420

Process measured parameter against predicted parameter
430

Output quality measure
440

Related U.S. Application Data

(60) Provisional application No. 62/879,375, filed on Jul. 26, 2019.

(51) Int. Cl.
| | |
|---|---|
| *B33Y 10/00* | (2015.01) |
| *G05B 19/4155* | (2006.01) |
| *G06T 7/00* | (2017.01) |
| *B23K 26/12* | (2014.01) |

(52) U.S. Cl.
CPC ............ *B33Y 50/02* (2014.12); *G06T 7/0002* (2013.01); *G06T 7/0004* (2013.01); *B23K 26/125* (2013.01); *G05B 2219/49023* (2013.01); *G06T 2207/30144* (2013.01)

(56) References Cited

U.S. PATENT DOCUMENTS

| | | | |
|---|---|---|---|
| 3,447,730 | A | 6/1969 | Jeannette |
| 3,555,235 | A | 1/1971 | Darrow et al. |
| 3,562,577 | A | 2/1971 | Kensrue |
| 3,934,482 | A | 1/1976 | Byers |
| 4,043,494 | A | 8/1977 | Bickford et al. |
| 4,047,656 | A | 9/1977 | Mccombs |
| 4,228,338 | A | 10/1980 | Cook et al. |
| 4,333,594 | A | 6/1982 | Cloos |
| 4,866,237 | A | 9/1989 | Inoue |
| 5,137,223 | A | 8/1992 | Brandon et al. |
| 6,004,124 | A | 12/1999 | Swanson et al. |
| 6,335,511 | B1 | 1/2002 | Rothermel |
| 6,391,251 | B1 | 5/2002 | Keicher et al. |
| 6,443,352 | B1 | 9/2002 | White |
| 6,557,742 | B1 | 5/2003 | Bobeczko et al. |
| 6,568,578 | B1 | 5/2003 | Kensrue |
| 6,776,602 | B2 | 8/2004 | Swanson et al. |
| 7,062,849 | B2 | 6/2006 | Ohashi et al. |
| 7,073,561 | B1 | 7/2006 | Henn |
| 7,168,935 | B1 | 1/2007 | Taminger et al. |
| 7,169,337 | B2 | 1/2007 | Swanson et al. |
| 7,235,149 | B2 | 6/2007 | Taggart |
| 7,335,854 | B2 | 2/2008 | Hutchison |
| 7,384,255 | B2 | 6/2008 | Labossiere et al. |
| 7,700,893 | B2 | 4/2010 | Kaufman |
| 7,754,597 | B2 | 7/2010 | Toyoda |
| 7,896,209 | B2 | 3/2011 | Batchelder et al. |
| 7,897,074 | B2 | 3/2011 | Batchelder et al. |
| 8,308,876 | B2 | 11/2012 | Woods et al. |
| 8,487,184 | B2 | 7/2013 | Rivernider et al. |
| 8,534,108 | B2 | 9/2013 | Austen |
| 8,647,102 | B2 | 2/2014 | Swanson et al. |
| 8,878,097 | B2 | 11/2014 | Enyedy et al. |
| 9,073,263 | B2 | 7/2015 | Mannella et al. |
| 9,102,099 | B1 | 8/2015 | Karpas et al. |
| 9,144,862 | B2 | 9/2015 | Hemmert et al. |
| 9,156,205 | B2 | 10/2015 | Mark et al. |
| 9,168,698 | B2 | 10/2015 | Kemperle et al. |
| 9,254,535 | B2 | 2/2016 | Buller et al. |
| 9,327,452 | B2 | 5/2016 | Mark et al. |
| 9,346,116 | B2 | 5/2016 | Guldberg |
| 9,399,264 | B2 | 7/2016 | Stecker |
| 9,440,397 | B1 | 9/2016 | Fly |
| 9,457,514 | B2 | 10/2016 | Schwärzler |
| 9,481,931 | B2 | 11/2016 | Stempfer |
| 9,616,494 | B2 | 4/2017 | Vader et al. |
| 9,724,877 | B2 | 8/2017 | Flitsch et al. |
| 9,764,517 | B2 | 9/2017 | Potter |
| 9,784,111 | B2 | 10/2017 | Luo et al. |
| 9,789,652 | B2 | 10/2017 | Armstrong |
| 9,833,839 | B2 | 12/2017 | Gibson et al. |
| 9,937,580 | B2 | 4/2018 | Peters et al. |
| 9,950,476 | B2 | 4/2018 | Nguyen et al. |
| 9,956,640 | B2 | 5/2018 | Burke et al. |
| 10,005,217 | B2 | 6/2018 | Willams et al. |
| 10,029,406 | B2 | 7/2018 | Burke et al. |
| 10,086,467 | B2 | 10/2018 | Burke et al. |
| 10,201,854 | B2 | 2/2019 | Sachs et al. |
| 10,232,443 | B2 | 3/2019 | Myerberg et al. |
| 10,272,492 | B2 | 4/2019 | Gibson et al. |
| 10,335,889 | B2 | 7/2019 | Burke et al. |
| 10,350,682 | B2 | 7/2019 | Myerberg et al. |
| 10,565,333 | B2 | 2/2020 | Lacaze et al. |
| 10,639,717 | B2 | 5/2020 | Fontana et al. |
| 11,813,690 | B2 | 11/2023 | Burke et al. |
| 11,853,033 | B1 | 12/2023 | Mccallum et al. |
| 2004/0179217 | A1 | 9/2004 | Chapman et al. |
| 2005/0017411 | A1 | 1/2005 | Yang et al. |
| 2005/0224486 | A1 | 10/2005 | Matiash |
| 2008/0073330 | A1 | 3/2008 | Diedrick et al. |
| 2008/0156783 | A1 | 7/2008 | Vanden Heuvel et al. |
| 2010/0193480 | A1 | 8/2010 | Adams |
| 2011/0018976 | A1 | 1/2011 | Park |
| 2011/0150517 | A1 | 6/2011 | Chauvin et al. |
| 2011/0240607 | A1 | 10/2011 | Stecker et al. |
| 2011/0309063 | A1 | 12/2011 | Ott et al. |
| 2012/0160897 | A1 | 6/2012 | Enyedy |
| 2012/0247167 | A1 | 10/2012 | Austen |
| 2012/0325779 | A1 | 12/2012 | Yelistratov |
| 2014/0042129 | A1 | 2/2014 | Daniel |
| 2014/0061165 | A1 | 3/2014 | Stempfer |
| 2014/0117575 | A1 | 5/2014 | Kemperle et al. |
| 2014/0242374 | A1 | 8/2014 | Strasser et al. |
| 2014/0265037 | A1 | 9/2014 | Stirling et al. |
| 2014/0374048 | A1 | 12/2014 | Kennedy et al. |
| 2014/0374935 | A1 | 12/2014 | Flitsch et al. |
| 2015/0021379 | A1 | 1/2015 | Albrecht et al. |
| 2015/0027239 | A1 | 1/2015 | Konkle |
| 2015/0108095 | A1 | 4/2015 | Kruer et al. |
| 2015/0140147 | A1 | 5/2015 | Konstantinos et al. |
| 2015/0145169 | A1 | 5/2015 | Liu et al. |
| 2015/0209889 | A1 | 7/2015 | Peters et al. |
| 2015/0239178 | A1 | 8/2015 | Armstrong |
| 2015/0312119 | A1* | 10/2015 | Liu ................... H04L 43/0817 |
| | | | 709/224 |
| 2015/0331402 | A1 | 11/2015 | Lin et al. |
| 2016/0031159 | A1 | 2/2016 | Church et al. |
| 2016/0052208 | A1 | 2/2016 | Debora et al. |
| 2016/0057250 | A1 | 2/2016 | Sakai et al. |
| 2016/0096318 | A1 | 4/2016 | Bickel et al. |
| 2016/0167156 | A1 | 6/2016 | Burke et al. |
| 2016/0193703 | A1 | 7/2016 | Kempers et al. |
| 2016/0200052 | A1 | 7/2016 | Moore et al. |
| 2016/0297104 | A1 | 10/2016 | Guillemette et al. |
| 2016/0318130 | A1 | 11/2016 | Stempfer et al. |
| 2016/0339633 | A1 | 11/2016 | Stolyarov et al. |
| 2017/0036399 | A1 | 2/2017 | Cheung |
| 2017/0050254 | A1 | 2/2017 | Holverson et al. |
| 2017/0050383 | A1 | 2/2017 | Bell et al. |
| 2017/0056970 | A1 | 3/2017 | Chin et al. |
| 2017/0087632 | A1 | 3/2017 | Mark |
| 2017/0089782 | A1 | 3/2017 | Hirt et al. |
| 2017/0129170 | A1 | 5/2017 | Kim et al. |
| 2017/0136567 | A1 | 5/2017 | Lahti et al. |
| 2017/0136579 | A1 | 5/2017 | Wagner et al. |
| 2017/0136587 | A1 | 5/2017 | Wagner et al. |
| 2017/0138409 | A1 | 5/2017 | Giese et al. |
| 2017/0144373 | A1 | 5/2017 | Erikson et al. |
| 2017/0152142 | A9 | 6/2017 | Kim et al. |
| 2017/0157826 | A1 | 6/2017 | Hishiki |
| 2017/0165781 | A1 | 6/2017 | Veldsman et al. |
| 2017/0173692 | A1 | 6/2017 | Myerberg et al. |
| 2017/0173693 | A1 | 6/2017 | Myerberg et al. |
| 2017/0173697 | A1 | 6/2017 | Myerberg et al. |
| 2017/0173877 | A1 | 6/2017 | Myerberg et al. |
| 2017/0203391 | A1 | 7/2017 | Budge |
| 2017/0220030 | A1 | 8/2017 | Grube et al. |
| 2017/0236639 | A1 | 8/2017 | Pieper et al. |
| 2017/0239721 | A1 | 8/2017 | Buller et al. |
| 2017/0252808 | A1 | 9/2017 | Myerberg et al. |
| 2017/0252809 | A1 | 9/2017 | Myerberg et al. |
| 2017/0252812 | A1 | 9/2017 | Mykulowycz et al. |
| 2017/0252813 | A1 | 9/2017 | Myerberg et al. |
| 2017/0252815 | A1 | 9/2017 | Fontana et al. |
| 2017/0252820 | A1 | 9/2017 | Myerberg et al. |

(56) References Cited

U.S. PATENT DOCUMENTS

| | | | |
|---|---|---|---|
| 2017/0252823 A1 | 9/2017 | Sachs et al. | |
| 2017/0252851 A1 | 9/2017 | Fulop et al. | |
| 2017/0282283 A1* | 10/2017 | Burke | B33Y 10/00 |
| 2017/0284876 A1 | 10/2017 | Moorlag et al. | |
| 2017/0304896 A1 | 10/2017 | Kovalchuk et al. | |
| 2017/0308062 A1* | 10/2017 | Albert | G05B 19/4099 |
| 2017/0312967 A1 | 11/2017 | Williams et al. | |
| 2017/0320277 A1 | 11/2017 | Wang | |
| 2017/0341306 A1* | 11/2017 | Burke | B23K 11/0006 |
| 2018/0009052 A1 | 1/2018 | Struksnes et al. | |
| 2018/0050414 A1 | 2/2018 | Hughes | |
| 2018/0071825 A1 | 3/2018 | Schmitt et al. | |
| 2018/0126671 A1 | 5/2018 | Wilenski et al. | |
| 2018/0154586 A1 | 6/2018 | Wang et al. | |
| 2018/0159288 A1 | 6/2018 | Wright | |
| 2018/0178314 A1 | 6/2018 | Maccormack et al. | |
| 2018/0194068 A1 | 7/2018 | Burke et al. | |
| 2018/0222119 A1 | 8/2018 | Burke et al. | |
| 2018/0297272 A1 | 10/2018 | Preston et al. | |
| 2018/0304370 A1 | 10/2018 | Myerberg et al. | |
| 2018/0311738 A1 | 11/2018 | Myerberg et al. | |
| 2019/0001412 A1 | 1/2019 | Gibson et al. | |
| 2019/0061336 A1 | 2/2019 | Yuan et al. | |
| 2019/0091933 A1 | 3/2019 | Barbati et al. | |
| 2019/0118260 A1 | 4/2019 | Schmitt et al. | |
| 2019/0160530 A1* | 5/2019 | Peters | B33Y 10/00 |
| 2019/0160755 A1 | 5/2019 | Blasco et al. | |
| 2019/0210294 A1 | 7/2019 | Hudelson et al. | |
| 2019/0366480 A1* | 12/2019 | Kotliar | B23K 26/08 |
| 2020/0324482 A1* | 10/2020 | Taig | G06F 30/00 |
| 2021/0016381 A1 | 1/2021 | Sales | |
| 2021/0053275 A1 | 2/2021 | Burke et al. | |
| 2021/0138538 A1 | 5/2021 | Kilcoyne et al. | |
| 2021/0138572 A1 | 5/2021 | Taig et al. | |
| 2023/0182228 A1 | 6/2023 | Burke et al. | |

FOREIGN PATENT DOCUMENTS

| | | | | |
|---|---|---|---|---|
| CN | 105690771 A | | 6/2016 | |
| CN | 107206536 A | | 9/2017 | |
| CN | 109843591 A | * | 6/2019 | B22F 12/53 |
| CN | 107206536 B | | 11/2019 | |
| EP | 2539100 A1 | | 1/2013 | |
| EP | 3022004 A1 | | 5/2016 | |
| EP | 3204223 A1 | | 8/2017 | |
| EP | 3229997 A1 | | 10/2017 | |
| GB | 2549653 A | | 10/2017 | |
| GB | 2549653 B | | 1/2019 | |
| HK | 1245719 B | | 10/2019 | |
| JP | S5853382 A | | 3/1983 | |
| JP | S6021385 A | | 2/1985 | |
| JP | 2015160217 A | | 9/2015 | |
| JP | 2018503535 A | | 2/2018 | |
| JP | 2018507317 A | | 3/2018 | |
| JP | 6532947 B2 | | 5/2019 | |
| JP | 2019195848 A | | 11/2019 | |
| JP | 6847152 B2 | | 3/2021 | |
| KR | 101614860 B1 | | 4/2016 | |
| MX | 2017007479 A | | 5/2018 | |
| WO | 1996011117 A1 | | 4/1996 | |
| WO | 2006133034 A1 | | 12/2006 | |
| WO | 2015180639 A1 | | 12/2015 | |
| WO | 2016094660 A1 | | 6/2016 | |
| WO | 2016162637 A1 | | 10/2016 | |
| WO | 2017073947 A1 | | 5/2017 | |
| WO | 2017151837 A1 | | 9/2017 | |
| WO | 2017152104 A2 | | 9/2017 | |
| WO | 2017152133 A1 | | 9/2017 | |
| WO | 2017152142 A1 | | 9/2017 | |
| WO | 2017180314 A1 | | 10/2017 | |
| WO | 2018191728 A1 | | 10/2018 | |
| WO | 2019055557 A1 | | 3/2019 | |
| WO | 2019078974 A1 | | 4/2019 | |
| WO | 2019079497 A1 | | 4/2019 | |
| WO | 2019079737 A1 | | 4/2019 | |
| WO | 2019079756 A1 | | 4/2019 | |
| WO | 2019118914 A1 | | 6/2019 | |
| WO | 2019133099 A1 | | 7/2019 | |
| WO | 2019136222 A1 | | 7/2019 | |
| WO | 2019157127 A1 | | 8/2019 | |
| WO | 2019157253 A1 | | 8/2019 | |
| WO | 2019157284 A1 | | 8/2019 | |
| WO | 2019246253 A1 | | 12/2019 | |
| WO | 2019246308 A1 | | 12/2019 | |
| WO | 2020033337 A1 | | 2/2020 | |

OTHER PUBLICATIONS

International Preliminary Report on Patentability for International Application PCT/US2015/065003, Report issued Jun. 13, 2017, Mailed on Jun. 22, 2017, 12 Pgs.

International Search Report and Written Opinion for International Application No. PCT/US2015/065003, Search completed Feb. 24, 2016, Mailed Mar. 9, 2016, 14 Pgs.

International Search Report and Written Opinion for International Application No. PCT/US2018/038052, Search completed Sep. 11, 2018, Mailed Sep. 20, 2018, 11 Pgs.

International Search Report and Written Opinion for International Application No. PCT/US2019/022785, Search Completed Jun. 25, 2019, Mailed Jun. 25, 2019, 14 pgs.

International Search Report and Written Opinion for International Application No. PCT/US2019/037971, Search completed Aug. 27, 2019, Mailed Sep. 23, 2019, 12 pgs.

International Search Report and Written Opinion for International Application No. PCT/US2019/045177, Search completed Dec. 6, 2019, Mailed Dec. 6, 2019, 10 Pgs.

"Copper Laminated Flexible Shunts", Bajeria Industries, 2016, Retrieved copy: May 27, 2021; Available at: http://www.bajeria.com/copper-laminated-flexible-shunts.html.

Sames et al., "The Metallurgy and Processing Science of Metal Additive Manufacturing.", International Materials Reviews, 2016, vol. 61, 315-360.

* cited by examiner

400

SYSTEMS AND METHODS FOR USING WIRE PRINTING PROCESS DATA TO PREDICT MATERIAL PROPERTIES AND PART QUALITY

CROSS-REFERENCE

This application is a Continuation of U.S. patent application Ser. No. 16/933,637, filed Jul. 20, 2020, which claims priority to U.S. Provisional Patent Application No. 62/879, 375, filed Jul. 26, 2019, the disclosures of which are hereby incorporated by reference in their entirety.

BACKGROUND

In manufacturing in general, such as three-dimensional (3D) printing, it may be desired to use process input parameters, and measurements and predictions of an intermediate state, to predict the material properties and final quality of a manufactured part. As an example, input power from the laser in a powder bed fusion process may affect how the temperature of a printed metal part varies with time (a printing state). Generally, this "thermal history" may affect how grains grown in a 3D object, including their size and orientation, as well as the porosity and thermal stresses in the 3D object. These attributes may ultimately influence the material properties and quality of the printed 3D object, including its strength, toughness, elasticity, and resistance to fatigue. As a second example, parameters of a wire-based metal additive manufacturing printing process—including wire feed rate, process power, temperature, and conditions of the atmosphere surrounding the print—may affect printing state and final material properties and quality measures of a part printed using the wire-based metal additive manufacturing printing process.

SUMMARY

Recognized herein is a need to develop methods and systems for using additive manufacturing printing process parameters and a variety of software tools and analysis techniques to predict intermediate states, and final material properties and quality of a three-dimensional (3D) object that has been printed. Methods and systems of the present disclosure provide for predicting intermediate states and/or final material properties, and a measure of quality, of a 3D object. This may be employed for use 3D objects that are printed by bringing a feedstock (e.g., wire) in contact with a support and directing current through the feedstock to melt (e.g., via Joule heating) the feedstock, to deposit at least a portion adjacent to the support. The feedstock may be heated by resistive heating (Joule heating).

In one aspect, a method for determining a quality of a three-dimensional (3D) object, is disclosed. The method includes first obtaining a set of printing parameters and a predicted state of the 3D object, which predicted state is generated using at least the set of printing parameters. Second, the method includes printing the 3D object in accordance with the printing parameters, which printing comprises (i) bringing a feedstock in contact with a support and (ii) directing flow of electrical current from the feedstock to the support, or vice versa, while the feedstock is in contact with the support. Third, the method includes processing at least one measured parameter of the 3D object against at least one predicted parameter of the 3D object to yield a quality measure of the 3D object, wherein the at least one measured parameter is measured during or after printing of the 3D object, and wherein the at least one predicted parameter of the 3D object is from the predicted state. Finally, the method includes electronically outputting the quality measure.

In some embodiments, the predicted state of the 3D object is a final state of the 3D object subsequent to printing.

In some embodiments, the predicted state of the 3D object is a state of the 3D object during printing.

In some embodiments, the predicted state is generated using at least one previous predicted state of the 3D object.

In some embodiments, the set of printing parameters comprises a rate at which the feedstock is directed towards the support.

In some embodiments, the printing parameter is a force with which feedstock is pressed into a print pool.

In some embodiments, at least one of the printing parameters is at least one atmospheric condition selected from the group consisting of oxygen level, water level, nitrogen level, argon level, another gas level, temperature level, and any combination thereof.

In some embodiments, the printing parameter is a temperature of a support on which the 3D object is printed.

In some embodiments, the printing parameter is a voltage of the printing process.

In some embodiments, the printing parameter is a current of the printing process.

In some embodiments, the printing parameter is a composition of an input feedstock.

In some embodiments, the printing parameter is a spacing between adjacent deposits of printing material.

In some embodiments, the printing parameter is a height of a printed layer.

In some embodiments, the printing parameter is a height of a deposition tip above a printed layer.

In some embodiments, the printing parameter is a deposition path shape.

In some embodiments, the printing parameter is a deposition history.

In some embodiments, the printing parameter is a local ambient gas velocity.

In some embodiments, the measured property is collected using one or more sensors.

In some embodiments, a sensor from the one or more sensors is selected from a group consisting of a camera, an electronic force meter, a barometer, a gas meter, a thermometer, a voltmeter, a multimeter, and an X-ray unit.

In some embodiments, the measured property is a voltage.

In some embodiments, the measured property is a current.

In some embodiments, the measured property is an electrical resistance.

In some embodiments, the measured property is a temperature at a location of the 3D object.

In some embodiments, the measured property is an atmospheric condition.

In some embodiments, the measured property is an atmospheric composition.

In some embodiments, the measured property is a weight of deposited material.

In some embodiments, the measured property is a thermal stress in the 3D object.

In some embodiments, the measured property is a thermal stress in a support.

In some embodiments, the measured property is an image analysis of deposited material.

In some embodiments, the measured property is a force with which feedstock is pressed into a process pool.

In some embodiments, obtaining the at least one predicted state is performed using statistical process control.

In some embodiments, obtaining the at least one predicted state is performed using a computational model.

In some embodiments, obtaining the at least one predicted state is performed using machine learning.

In some embodiments, obtaining the at least one predicted state is performed using iterative shooting.

In some embodiments, obtaining the at least one predicted state is performed using an algorithmic estimator.

In some embodiments, obtaining the at least one predicted state is performed using computational software.

In some embodiments, the predicted state is a thermal history of at least one portion of the 3D object.

In some embodiments, the predicted state is a weight or density of the 3D object.

In some embodiments, the predicted state is a pressure on at least one portion of the 3D object.

In some embodiments, the predicted state is a chemical composition of at least one portion of the 3D object.

In some embodiments, the predicted state is a stress of at least one portion of the 3D object.

In some embodiments, the predicted state is a size of a grain of the 3D object.

In some embodiments, the predicted state is an orientation of grains of the 3D object.

In some embodiments, the predicted state is a composition of metallic structures within grains of the 3D object.

In some embodiments, the predicted state is a phase of a metal of the 3D object.

In some embodiments, the predicted state is at least one strain of at least one portion of the 3D object.

In some embodiments, the predicted state is a degree of fusions between adjacent deposit regions of the 3D object.

In some embodiments, in (c), the processing provides at least one predicted property.

In some embodiments, the predicted property is maximum tensile strength.

In some embodiments, the predicted property is yield strength.

In some embodiments, the predicted property is maximum elongation at failure.

In some embodiments, the predicted property is porosity.

In some embodiments, the predicted property is a fatigue property.

In some embodiments, the predicted property is a corrosion resistance.

In some embodiments, the predicted property is a resistance to creep.

In some embodiments, the predicted property is an electrical conductivity.

In some embodiments, the predicted property is a thermal conductivity.

In some embodiments, the quality measure is dimensional accuracy.

In some embodiments, the quality measure is surface width.

In some embodiments, the quality measure is strength.

In some embodiments, the quality measure is durability.

In some embodiments, the quality measure is corrosion resistance.

In some embodiments, the quality measure is electrical conductivity.

In some embodiments, the quality measure is thermal conductivity.

In some embodiments, the quality measure is warp or dimensional instability.

In one aspect, a system for updating a plurality of printing instructions for a three-dimensional (3D) printer, is disclosed.

The system comprises at least one computer memory configured to maintain in memory a set of printing parameters, one or more predicted states, and at least one measured parameter; and one or more computer processors operatively coupled to said at least one computer memory, wherein said one or more computer processors are individually or collectively configured to: (i) obtain a set of printing parameters and a predicted state of said 3D object. The predicted state is generated using at least said set of printing parameters. The system is further configured to (ii) print said 3D object in accordance with said printing parameters, which printing comprises (i) bringing a feedstock in contact with a support and (ii) directing flow of electrical current from said feedstock to said support, or vice versa, while said feedstock is in contact with said support. The system is further configured to (iii) process at least one measured parameter of said 3D object against at least one predicted parameter of said 3D object to yield a quality measure of the 3D object. At least one measured parameter is measured during or after printing of said 3D object. At least one predicted parameter of said 3D object is from the predicted state. Finally, the system is configured to (iv) electronically output said quality measure.

In another aspect, a method for determining a quality of each of a plurality of three-dimensional (3D) objects is disclosed. The method comprises (a) printing each of the plurality of 3D objects, and (b) using at least one measured parameter from each of said plurality of 3D objects measured during or subsequent to said printing to generate a measure of said quality of each of said plurality of 3D objects.

In some embodiments, (b) is performed during the printing.

In some embodiments, (b) is performed subsequent to the printing.

In some embodiments, the predicted property is hardness.

In some embodiments, the printing parameter is a direction of adjacent deposits of printing material.

In some embodiments, the printing parameter is a dimension of feedstock, wherein a dimension is selected from a group consisting of diameter and cross-sectional shape.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
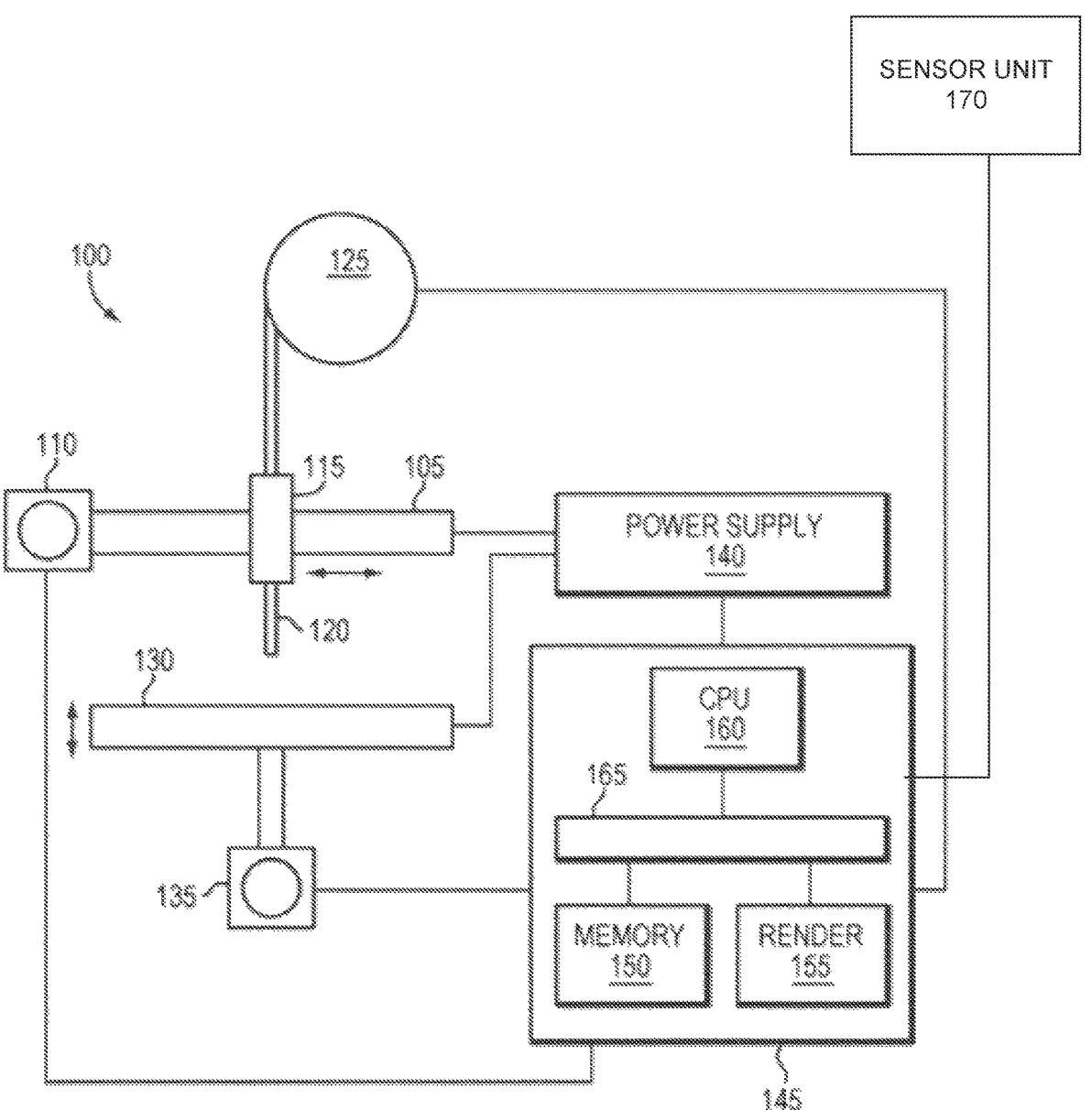
FIG. 1 shows a three-dimensional printing apparatus.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The disclosed systems and methods enable prediction of material properties and final qualities of a three-dimensional (3D) object manufactured using an additive manufacturing method, such as a method that uses resistive (e.g., Joule) heating to melt at least a portion of a feedstock (e.g., wire). Prediction of these properties and final qualities is based on analysis of one or more process input parameters, one or more process measurements, and one or more printing states. Analysis of these inputs may be performed using many techniques, including statistical process control, numeric and closed-form methods, and machine learning algorithms.

Analyzing process measurements from wire-based metal additive manufacturing differs from analogous techniques for other 3D printing methods in fundamental ways. The specific method of wire printing, heating feedstock in contact with a support by directing a flow of electrical current, necessitates that different measurements and parameters be analyzed in order to predict properties of the 3D printing material and quality measures of the part itself. Measurements and parameters that include the material of the feedstock, the temperature to which it is heated, level of current flowing through the circuit, and ambient conditions, uniquely affect the 3D printed output in ways that differ from powder-based printing or from other methods of 3D metal printing.

The process input parameters may be user-defined or default parameters used by computer software to enable a user to control printing of a 3D object. They may also be physical inputs of the printing process. The computer software may be used to provide instructions to a controller within a wire-based metal additive manufacturing additive manufacture system, which may use actuators or other mechanical components to direct a feedstock towards a support (e.g., platform or a previously deposited portion of the 3D object) to print the 3D object.

The process measurements may be taken before, during, or after a print job has been completed. The process measurements may be taken by a sensor unit, which may be attached to or communicatively coupled to the 3D printing system. Measurements taken at time intervals may be analyzed by a trained machine learning algorithm or statistical method, in order to determine intermediate printing states, material properties, or infer a quality of a final printed part. The process measurements may also be recorded when parameters are defined in 3D printing software. The system may collect 150 signals in real-time and perform real-time calculations on the signals. The system may calculate summary statistics, including averages (arithmetic mean, geometric mean, median, mode), variances, and standard deviations.

The systems may measure printing states during the duration of printing. A printing state may be one or more particular values of measurements or process parameters collected during a specific time period. The system may perform analysis on multiple printing states in order to predict part quality statistics or material properties.

The system may predict one or more quality measures for the printed part, from a combination of printing states, initial printing parameters, and process measurements. The part quality measure may demonstrate acceptability criteria for the printed part. Exemplary part quality measures may include durability, tensile strength, hardness, elasticity, electrical conductivity, and heat resistance.

The system may also predict one or more material properties using one or more types of analysis. The system may make a binary prediction, indicating whether the 3D printed object has or does not have a particular property. The system may make a multiclass prediction, indicating that the 3D printed object may have one of a set of properties.

In accordance with embodiments of the invention, 3D metal structures may be fabricated layer-by-layer using an apparatus 100, as shown in FIG. 1. Apparatus 100 includes a mechanical gantry 105 capable of motion in one or more of five or six axes of control (e.g., one or more of the XYZ planes) via one or more actuators 110 (e.g., motors such as stepper motors). As shown, apparatus 100 also includes a wire feeder 115 that positions a metal wire 120 inside the apparatus, provides an electrical connection to the metal wire 120, and continuously feeds metal wire 120 from a source 125 (e.g., a spool) into the apparatus. A baseplate 130 is also typically positioned inside the apparatus and provides an electrical connection; the vertical motion of the baseplate 130 may be controlled via an actuator 135 (e.g., a motor such as a stepper motor). An electric power supply 140 connects to the metal wire 120 and the baseplate 130, enabling electrical connection therebetween. The motion of the gantry 105 and the motion of the wire feeder 115 are controlled by a controller 145. The application of electric current from the power supply 140, as well as the power level and duration of the current, is controlled by the controller 145.

The computer-based controller 145 in accordance with embodiments of the invention may include, for example, a computer memory 150 and a 3D rendering module 155. Computational representations of 3D structures may be stored in the computer memory 150, and the 3D rendering module 155 may extract sets of data corresponding to successive layers of a desired 3D structure from the computational representation. The controller 145 may control the mechanical actuators 110, 135, wire-feeding mechanism 115, and power supply 140 to form successive layers deposited metal segments in accordance with the data.

One or more parameters to be measured during the printing process may be recorded from computer software used to create the computational model. For example, the user may set parameters for printing of the 3D object, which may be recorded and stored for analysis. In addition, computer software may record printing states before, during, and after printing. Some measurements, such as feedstock usage and feedstock rate, may be calculated using computer software programs. For example, a simulation program may report a projected material usage for a 3D part before it is printed. Some programs may display feedstock usage while the 3D object is being printed, as well as a printing time.

The computer-based control system (or "controller") 145 in accordance with embodiments of the present invention may include or consist essentially of a general-purpose computing device in the form of a computer including a processing unit (or "computer processor") 160, the system memory 150, and a system bus 165 that couples various system components including the system memory 150 to the processing unit 160. Computers typically include a variety of computer-readable media that can form part of the system memory 150 and be read by the processing unit 160. By way of example, and not limitation, computer readable media may include computer storage media and/or communication media. The system memory 150 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 160. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 160 that executes commands and instructions may be a general-purpose computer processor, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

The sensor unit 170 may include a plurality of sensors for taking process measurements before, during, and after printing. The sensors may include, for example, an electronic force meter, a barometer, a gas meter, a thermometer, a voltmeter, a multimeter, x-ray, devices to measure height, width, and roughness of a printed layer or part, and other measurement devices. The sensor unit may be communicatively coupled to the controller, and, in some embodiments, physically coupled to the controller. The sensor unit may contain one or more cameras, which may take still images or video of the 3D object as it is being printed. The still images may be saved in order to determine particular printing states. The camera may take multi-view images, or take different shots comprising multiple views, which may each provide information for multiple states or which together may be used to determine a single printing state. The camera may be a high-resolution camera, capable of imaging orientations of grains within the material or metallic structures within the 3D printing material. The sensor unit may comprise an X-ray unit which may be used to perform X-ray crystallography using diffraction. Machine learning algorithms may also be able to analyze video data itself, rather than individual video frames. Video data may also be used to control the printing process.

Printing states to be measured may be time-binned features that may track a history of an aspect of the 3D printed part. Descriptive features may be recorded along with time-stamps, and used as inputs to a machine learning algorithm, such as an LSTM algorithm. The machine learning algorithm may be trained to apply heavier weights to states that occur further in the past than others. The machine learning algorithm may also be trained to weight states based on whether they involve printing particular sections of the 3D part. For example, it may be more necessary for a base of a 3D object to be sturdy than a cosmetic feature. It may be more important that some sections of the 3D printed part be able to withstand high temperatures than others.

Figure 2:
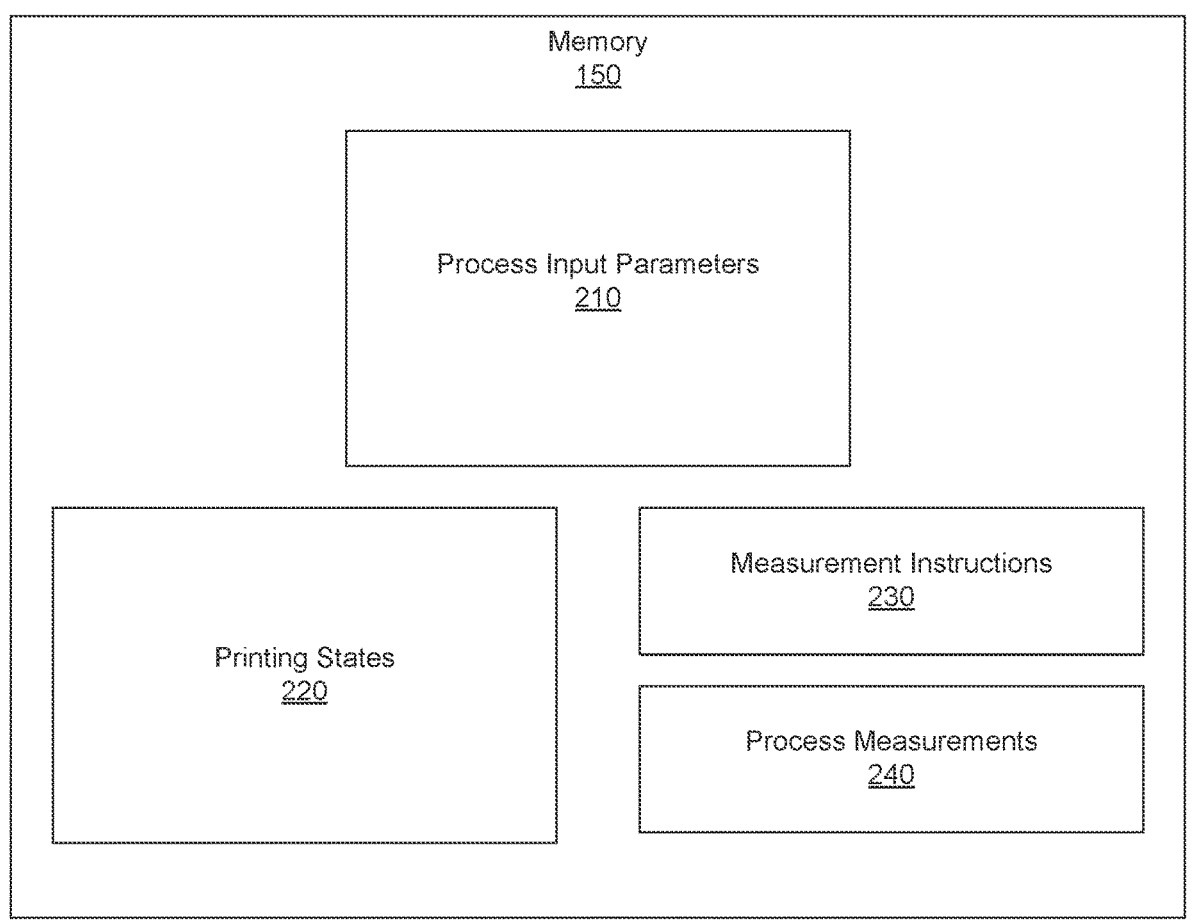
FIG. 2 shows an expanded view of a memory of a three-dimensional printing apparatus.

FIG. 2 shows an expanded view of the memory 150. The memory 150 stores process measurements 240, measurement instructions 230, process input parameters 210, and printing states 220.

The measurement instructions 230 may be provided by a user or hard-coded into software used to generate computational 3D models for printing, before being stored in memory. The process measurements 240 that may be recorded from implementing the measurement instructions may include one or more voltages of the printing process, one or more currents of the printing process, one or more electrical resistances at one or more places in the wire-based metal additive manufacturing printing system, one or more temperatures at one or more places in the printed part, atmosphere conditions and atmospheric composition, one or more weights of deposited material, thermal stress in the 3D part (at a point(s), region(s), or overall), thermal stress in the support (at a point(s), region(s), or overall), image analysis of deposit and part dimensions (visual, thermal, static and video), and a force with which feedstock is pressed into the process pool.

The measurement instructions 230 may be configured to measure process measurements 240 at various times within the printing process. For example, the measurement instructions 230 may instruct recording of a measurement at the beginning or at the end of a print job. The measurement instructions may instruct measurements at specific time intervals, which may be provided to the analysis module as time-binned features. The measurement instructions 230 may be used to measure printing conditions or states of the 3D object. The measurement instructions 230 may be configured or written to induce measurements of all properties at a particular time, or to take different types of measurements at different times throughout a print job. The measurement instructions 230 may be written or entered manually by a user, or may be generated automatically by a computer system communicatively coupled to the 3D printing device. Different sets of instructions may be used for different types of analysis, in order to predict different properties or different aspects of part quality.

The process input parameters 210 may be input by users of 3D printing software in order to modify the structure of the 3D printed part, or to imbue the 3D printed part with particular characteristics. Process input parameters 210 may be differentiated from process measurements in that they may reflect conditions only prior to commencement of a print job. In addition, process input parameters 210 may be set by a user, be default parameters, or may correspond with mechanical constraints of the printing apparatus or with constraints of the operating environment.

The wire-based metal additive manufacturing additive manufacturing method process input parameters 210 may include a rate at which feedstock (e.g., wire) is introduced to a printing process, a force with which feedstock is pressed into a print pool, atmospheric conditions (e.g., level of oxygen, water, nitrogen, argon or other gases, or atmospheric temperature), a temperature of the support upon which the part is printed, one or more voltages of the printing process, one or more currents of the printing process, one or more compositions of input feedstock, spacing between adjacent deposits, direction of adjacent deposits, a height of a printed layer, a height of a deposition tip above a printed layer, a deposition path shape, a deposition history at vertically and laterally adjacent voxels, dimension of feedstock, such as feedstock diameter and cross-sectional shape, a material deposition rate, a temperature to which a substrate is heated, and a local ambient gas velocity.

Printing states 220 may be predicted using measured information taken from a snapshot of the 3D object at a particular point during the printing process. For example, a printing state may be predicted from a 2D or 3D image of a partially formed 3D part. A printing state may also be predicted from a list of parameters or measurements taken by the sensor unit during the printing process at a single point in time, or over a period of time. Printing states may be predicted following printing of percentages of the 3D part printed, such as 25%, 50%, or 75% printed. These percentages may be determined by comparing a 3D or 2D image of the final printed part to a captured image of the 3D part. The printing state may also be captured following an amount of depletion of printing material, or an intermediate material composition of the 3D printed part. A printing state may also be captured when a printer is located at a particular point or within a particular region of a printing area.

Printing states 220 that might be predicted may include a thermal history of a printed part at a point, multiple points in the part, a region or multiple regions, or the overall average for the part; one or more weights or densities of a printed part (at a point(s), region(s), or overall), the temperature of the support upon which the part is printed, (at a point(s), region(s), or overall), pressure on the printed part (point(s), region(s) or overall), content of an atmospheric element (e.g., oxygen) in the printed part at a point(s), region(s), or overall), chemical composition of a part (at a point(s), region(s), or overall), stresses in a part (at a point(s), region(s), or overall), stresses in the support (at a point(s), region(s), or overall), the size of grains or crystals in a part (at a point(s), region(s), or overall), the orientation of grains or crystals in a part (at a point(s), region(s), or overall), the metallic structures within the grains or crystals in a part (at a point(s), region(s), or overall), the phase of the metal in a part (at a point(s), region(s), or overall), strain at a point(s), region(s), or overall, the degree of fusion between adjacent deposit regions.

Figure 3:
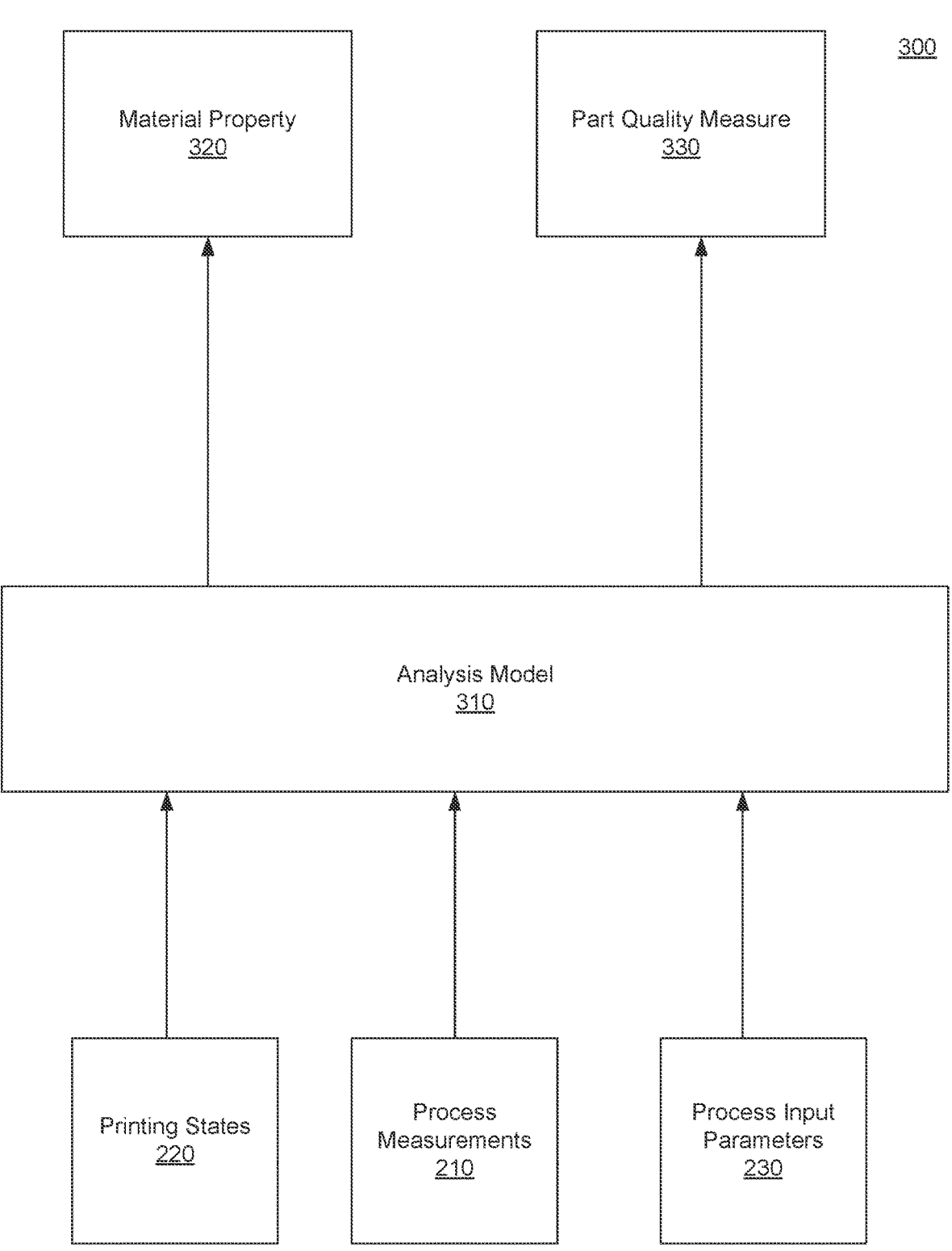
FIG. 3 shows an analysis system.

FIG. 3 shows an analysis system 300. The analysis system 300 takes as inputs printing parameters 220, process parameters 210, and printing states 230. The analysis system 300 may process these inputs using one or more analysis models 310. The analysis system 300 uses the analysis models 310 to produce a predicted material property 320 or a quality measure 330.

An analysis model may be stored in the memory 150, or accessible via a network. For example, the analysis model may be hosted on a remote server, and may perform real-time analysis during printing. The remote server may be accessible via a network connected to a computing device coupled to the 3D printing apparatus.

Analysis models 310 may include statistical process control, physical models that predict how a state of the part (temperature, weight, etc) evolve with time, machine learning and automated pattern recognition algorithms, iterative shooting methods to estimate future state from present state and initial state, algorithmic estimators (e.g., a Kalman filter) that combine measurements and/or model data to estimate states of one or more properties, computational software such as COMSOL and Flow3D for predicting initial, transient, and steady state conditions.

Multiple analysis models may be used and stacked on top of one another. For example, predicting part quality or material properties may use a neural network to make predictions, but may employ Kalman filters at different stages of the network to reduce errors.

Statistical process control (SPC) is a method of monitoring quality of a particular process is performed by the use of statistical methods. SPC may use control charts to determine statistically acceptable variation in a process. A control chart may plot changes and variations of a process over time. The control chart may display information including the average of the process, an upper control limit for the process (beyond which the process is considered to be unstable) and a lower control limit for the process. Control charts may be developed for various process parameters and measurements, and changes in parameters and measurements may be recorded over time. From viewing trends and shifts in these measurements, quality measurements may be predicted. For example, if a particular process trends towards either the upper or lower limit, or swings wildly, the system may predict an unstable process, and thus a poor quality outcome for the 3D part. The disclosed system may perform univariate SPC, measuring one property or quality metric, or may perform multivariate SPC, measuring multiple properties and quality metrics in a single pass of an SPC algorithm.

Computational models may be used to simulate the 3D printed part and determine how input process parameters and measurements may affect the formation of the 3D object. For example, a computer software program may be configured to accept input parameters and initial measurements, as well as a 3D model of the part to be printed and the type of apparatus performing the printing. The software may then simulate a build of the 3D printed object, taking the parameters into account. The software may be able to extrapolate the final 3D object from the initial state or from a set of input intermediate states, or from both. The software program may provide a user with information predicting how states of the part evolve with time using a graphical display. For example, the software may be configured by a user to track a temperature of the part over the printing time of the 3D object.

The system may use an iterative shooting method to predict properties or quality of a 3D object. The system may determine output quality measurements or intermediate quality measurements for particular input parameters and measurements. The system may track rates of change for some or all of these parameters and measurements. Using these initial conditions and rates of change, the system may be able to fit a function relating the output quality measure to the weights of the input parameters and measurements.

The analysis model 310 may be a machine learning model. The analysis model 310 may be a neural network, support vector machine, logistic regression, decision tree model, or other machine learning model. The analysis model 310 may be statistical process control, a physical model, an iterative shooting method, algorithmic estimator, or computational software. The analysis model 310 may be a deep network which may include a linked network of multiple different machine learning algorithms.

The analysis model 310 may use a neural network. The neural network may take as inputs the process inputs and the measurements. The neural network may be a convolutional neural network or a recurrent neural network. For example, the neural network may be a long short-term memory (LSTM) network. The neural network may be a deep neural network, with many layers of neural networks feeding into one another. The neural network may also include one or more dense layers or fully connected layers for producing predictions or inputs to layers that have the correct dimensions.

The analysis model 310 may be a tree-based model. The analysis model 310 may use one or more decision trees, or may use bagging or bootstrapping. The analysis model 310 may be a random forest or may use gradient boosted trees. For example, the model may select a subset of features predictive of high electrical conductivity. The model may select a particular feature from the subset, at random, to seed a tree and create a branch. The model may grow the tree by branching with additional features, until the tree has reached a particular height. The model may then select other random subsets and create additional trees. The trees may all produce scores, which may be used to classify the part. These scores may be aggregated in order to provide more robust predictions.

One or more machine learning algorithms may analyze an embedding of the measurements and of the parameters. For example, non-numeric parameters and measurements may be converted to numbers that may be analyzed by the system.

The analysis model 310 may be a binary classifier, such as a neural network, logistic regression, or support vector machine (SVM) model. Images of intermediate states may be analyzed, for example, using a convolutional neural network (CNN). The CNN may be used to determine features in intermediate states that may be predictive of properties or part quality. For example, a CNN may be able to determine whether there are cracks in the 3D printed object at various intermediate stages, indicating the final part may be brittle in quality. Multiple trained machine learning algorithms may be used together to predict multiple material properties or quality aspects. For example, one machine learning algorithm may be used to predict electrical conductivity, while another may be used to predict thermal conductivity.

An analysis model 310 using a machine learning algorithm may output a quality measure prediction 330 as a binary determination. For example, a 3D part may be predicted to be "good" or "defective." The quality determination may be a multiclass determination. For example, parts may be given scores, which may be scaled and related to labels such as "excellent", "good", "fair", and "poor."

A material property 320 may also be a binary prediction. For example, a binary prediction may indicate whether or not a 3D printed material has a particular property. A multiclass determination may indicate multiple intensities or severities of properties, or may indicate a most likely property out of a discrete set of properties.

The analysis model 310 may be a Kalman filter. For example, noisy measurements of particular states taken at multiple time periods may be compared with noisy intermediate state predictions to those time periods. The comparison may be used to produce a more precise estimate than either the intermediate state predictions or the noisy measurements. Kalman filters may be used to predict intermediate states, material properties, or quality measures.

Computational software such as COMSOL and Flow3D may be used for predicting initial, transient, and steady state conditions. Flow3D, for example, may be used to simulate an additive manufacturing process, including interactions between individual deposited segments. Flow3D may be able to perform simulations of melting feedstock, by plotting temperature, temperature gradients, and solid fractions, for example. COMSOL may use numerical analysis to estimate material properties of a 3D printed part.

The analysis models 310 exemplified may predict material properties and quality measures of the 3D printed object. Material properties may pertain to the 3D printing material itself after printing has completed. Part quality measures may pertain to aspects of the 3D part itself, and may overlap with material properties.

Material properties predicted may include maximum tensile strength, yield strength, maximum elongation at failure, porosity and/or density, hardness, fatigue properties, corrosion resistance, resistance to creep, electrical conductivity, and thermal conductivity.

Part quality measures 330 predicted may include dimensional accuracy, surface finish, strength, durability, resistance to corrosion, electrical conductivity, thermal conductivity, and warp or dimensional instability during, or after the printing process.

Figure 4:
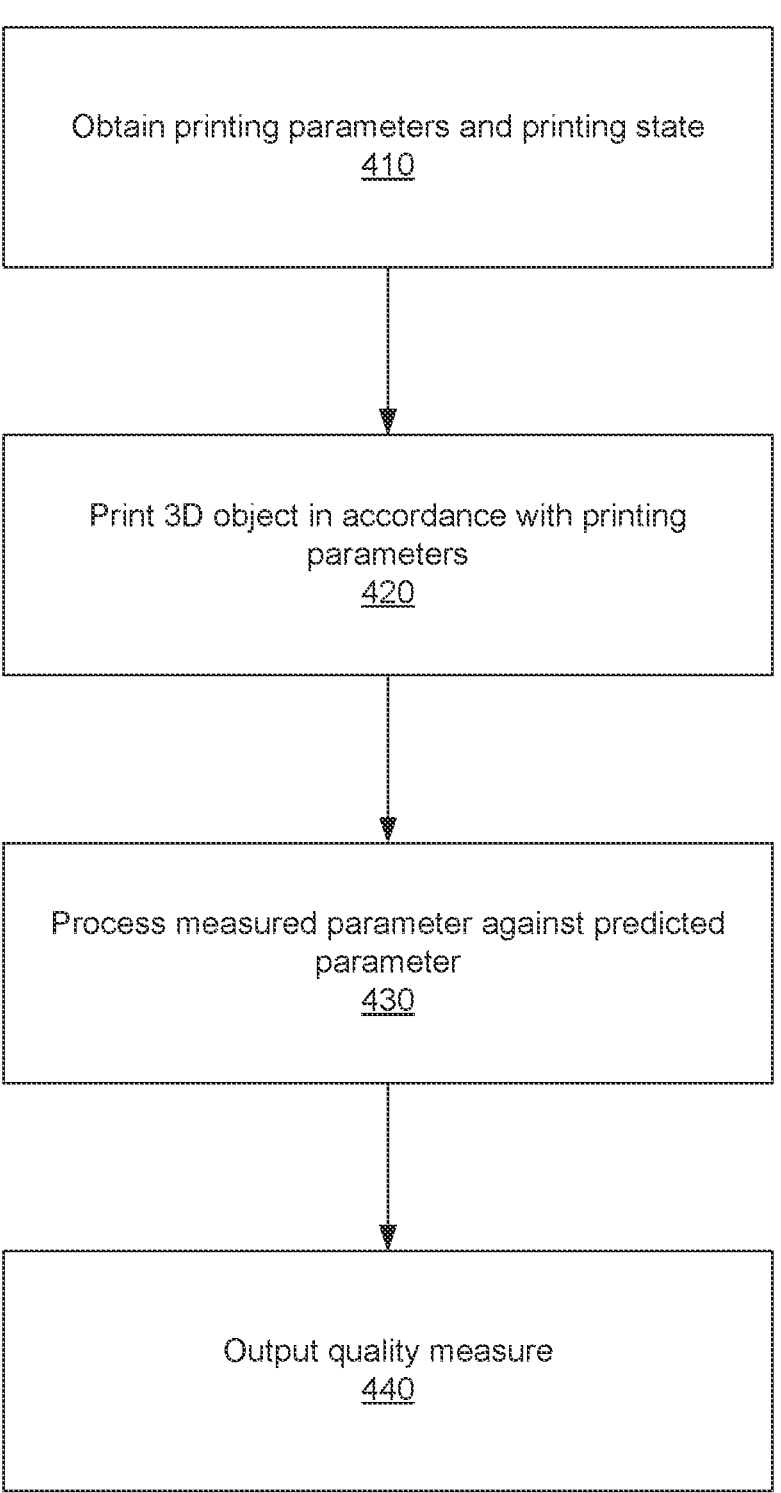
FIG. 4 shows a process flow diagram for predicting a quality measure of a three-dimensional printed part.

FIG. 4 illustrates a flowchart 400 for determining a quality measure of a 3D object. The steps within the flowchart of FIG. 4 may also be used to determine a material property of a material composing the 3D object.

In a first operation 410, the system obtains a set of printing parameters and a predicted state of a 3D object. The printing parameters may be obtained from user instructions or selections within a user interface of a computer software program for printing 3D objects. They may also be obtained from mechanical requirements of the 3D printing apparatus or from environmental conditions prior to commencement of printing. The predicted state may be generated using at least the set of printing parameters. The predicted state may be a state prior to printing, a state following completion of printing, or an intermediate state, predicted at a future time during printing. The predicted state may also be generated using a set of process measurements, if the predicted state were to be generated following commencement of printing.

In a second operation 420, the system prints the 3D object in accordance with the printing parameters. The printing includes bringing a feedstock, which may be a wire comprising one or more metals, in contact with a support. Printing may additionally comprise directing flow of current from the feedstock to the support, or vice-versa, while the feedstock is in contact with the support. Both the support and a print head including the feedstock may be connected in series with a power supply, which may oriented to supply a current from the print head to the support or from the support to the print head.

In a third operation 430, the system may process at least one of the measured parameters of the 3D object against at least one predicted parameter, or predicted state, of the 3D object in order to yield the quality measure. The measured parameter and predicted states are measured before, during, or after printing of the 3D object. Processing may be performed using one or more of many types of analysis methods, including statistical methods, numerical methods, and machine learning methods. Processing may be performed multiple times over the course of printing the 3D object, in order to refine or enhance a quality measure prediction. The third step may occur at any time during or after printing. Finally, the system outputs 440 the quality measure. The quality measure may be presented on an oscilloscope or another type of measurement device in real-time. The quality measure may also be printed in a report. Quality measures and predictions may be printed at various stages of 3D printing, and the system may compare results of printings. The printed report may be generated in MATLAB, Excel, PDF, or hard copy format.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Computer Systems

Figure 5:
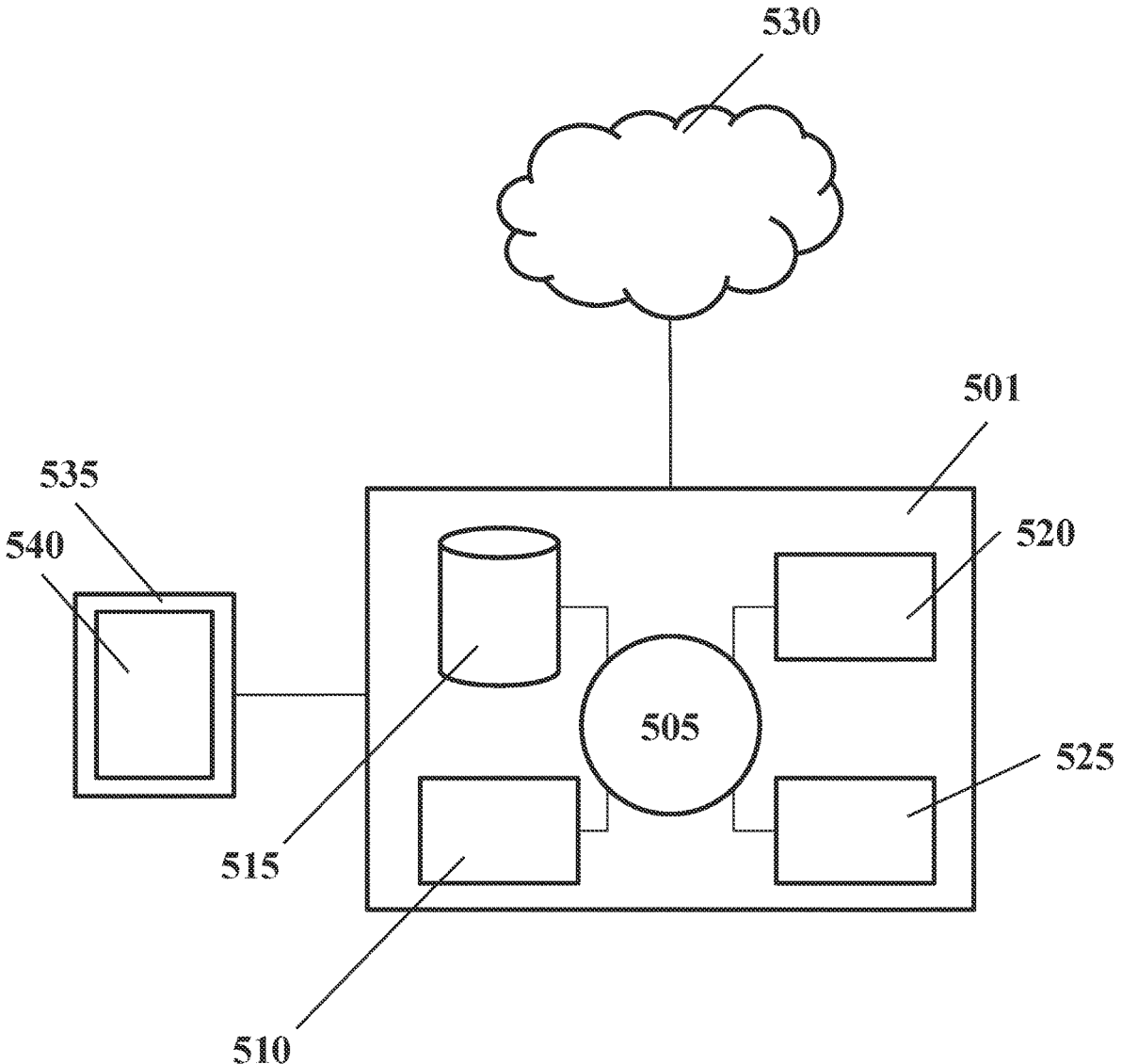
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to implement software for generating instructions to print a 3D object. The computer system 501 can regulate various aspects of maintaining multiple instruction sets of the present disclosure, such as, for example, visualizing the 3D object, storing sets of instructions, creating branching sets of instructions, and maintaining a hierarchy of object components. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., another user of a 3D printer). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 1115 and stored on the memory 510 for ready access by the processor 1105. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, instructions for printing a 3D object using a 3D printer. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, generate 3D printing instructions.

Methods for 3D Printing

Methods and systems of the present disclosure may be employed for use with various types of three-dimensional (3D) printing, including bringing a feedstock (e.g., wire) in contact with a support and directing current through the feedstock to melt (e.g., via Joule heating) the feedstock, to deposit at least a portion adjacent to the support. Examples of methods and systems that may be used to print 3D objects are provided in U.S. Patent Publication No. 2016/0167156, which is entirely incorporated herein by reference.

For example, the apparatus 100 of FIG. 1 may print a 3D object using resistive heating (e.g., Joule heating). In this example, the 3D object may be printed on a support or a layer previously deposited over the support by receiving in computer memory a computational representation of the 3D object. Subsequent to receiving the computational representation of the 3D object, directing at least one feedstock (e.g., wire) through an opening of a feeder until the feedstock is in contact with the support or the layer previously deposited over the support. A power supply may be used to flow electrical current through the at least one feedstock and into the support or the layer previously deposited over the support. The at least one feedstock may be subjected to Joule heating upon flow of electrical current through the at least one feedstock and into the support or the layer previously deposited over the support, or vice versa. The Joule heating may be sufficient to melt a portion of the at least one feedstock. The portion of the at least one feedstock may be deposited on the support or the layer previously deposited over the support to yield a layer comprising the portion of the at least one feedstock. This may be performed while holding the feedstock in contact with and stationary relative to the support or in contact with and while moving the feedstock or the support relative to one another, such as, for example, by moving the feedstock parallel to a surface of the support and/or moving the support relative to the feedstock. This approach may be repeated one or more times to deposit one or more additional layers of the at least one feedstock.

For example, metal segments are formed by melting a tip of a wire with electric current. The wire may have a substantially circular cross-section, for example, but the wire may have a cross-section that is substantially rectangular, square, or ovular. The diameter (or other lateral cross-sectional dimension) of the metal wire may be chosen based on the desired properties of deposition, but may be from about 0.1 mm to 100 mm, or 0.1 mm to 10 mm, or 0.1 mm to 1 mm, for example. The metal wire may be one electrode, and a metallic baseplate of the apparatus may be is another electrode. When the wire is in physical contact with the baseplate, the two may also be in electrical contact. There may be an electrical resistance between the wire and baseplate (i.e., contact resistance) due to the relatively small surface area of the wire and the microscopic imperfections on the surface of the baseplate and the tip of the wire. The contact resistance between the wire and baseplate may be the highest electrical resistance experienced by an electric current that is passed between the two electrodes (i.e., the wire and baseplate), and the local area at the contact point is heated according to Equation 1 (i.e., Joule's First Law).

$$Q = I^2 \times R \times t \qquad \text{Equation 1}$$

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for printing a three-dimensional (3D) object, comprising:

obtaining, with a controller, a) a set of printing parameters and b) a predicted state of a 3D object that is based on at least one printing parameter of said set of printing parameters, wherein said predicted state of said 3D object is a state of said 3D object during printing, and wherein said controller is configured to extract data corresponding to successive layers of said 3D object and to control, in accordance with said data, a mechanical movement system capable of motion in one or more of five or six axes and a wire feeder that positions a wire;

bringing, with said mechanical movement system and said wire feeder, said wire adjacent to a support and directing current to melt said wire and thereby printing said wire adjacent to said support, in accordance with said set of printing parameters;

performing a function at multiple times over course of said printing, said function comprising:

processing a measured parameter of said 3D object against at least one printing parameter of said set of printing parameters to determine at least one quality measure of said 3D object, wherein said at least one quality measure comprises at least one of: dimensional accuracy, surface finish, strength, warp, and dimensional instability;

predicting an intermediate printing state of said 3D object, of a set of predicted intermediate printing states compiled over the multiple times performing the function, based at least in part on a still image, video, or other sensed measurement of said 3D object, as partially formed, and electronically outputting said at least one quality measure in real-time; and from said set of predicted intermediate printing states, determining a final 3D object, wherein said final 3D object is said 3D object after printing.

2. The method of claim 1, wherein said at least one printing parameter of said set reflects a deposition path shape.

3. The method of claim 1, wherein said at least one printing parameter of said set comprises a printing parameter that reflects stresses in said final 3D object at a point, a region, or overall.

4. The method of claim 1, wherein said intermediate printing state reflects strain in said final 3D object at a point, a region, or overall.

5. The method of claim 1, wherein said measured parameter is collected using one or more sensors in communication with said controller.

6. The method of claim 5, wherein said one or more sensors comprises a camera.

7. The method of claim 1, wherein said measured parameter is based on an image analysis of deposited material.

8. The method of claim 1, wherein obtaining said intermediate printing state is predicted using a computational model, machine learning, and/or an algorithmic estimator.

9. The method of claim 1, wherein said intermediate printing state is predicted when said wire feeder is located at a particular point or within a particular region of a printing area.

10. A system for printing a three-dimensional (3D) object, comprising:

a controller configured to extract data corresponding to successive layers of a 3D object and to control, in accordance with said data, a mechanical movement system capable of motion in one or more of five or six axes and a wire feeder that positions a wire, at least one computer memory configured to maintain in memory a set of printing parameters, one or more predicted states, and at least one measured parameter;

one or more computer processors operatively coupled to said at least one computer memory, wherein said one or more computer processors are individually or collectively configured to:

obtain a) said set of printing parameters and b) a predicted state of said 3D object that is based on at least one printing parameter of said set of printing parameters, wherein said predicted state of said 3D object is a state of said 3D object during printing;

with said mechanical movement system and said wire feeder, bring said wire adjacent to a support and direct current to melt said wire and thereby print said wire adjacent to said support, in accordance with said set of printing parameters;

perform a function at multiple times over course of said printing, said function comprising:

processing a measured parameter of said 3D object against at least one printing parameter of said set to determine at least one quality measure of said 3D object, wherein said at least one quality measure comprises at least one of: dimensional accuracy, surface finish, strength, warp, and dimensional instability;

predicting an intermediate printing state of said 3D object, of a set of predicted intermediate printing states compiled over the multiple times performing the function, based at least in part on a still image, video, or other sensed measurement of said 3D object, as partially formed, and electronically outputting said at least one quality measure in real-time; and from said set of predicted intermediate printing states, determine a final 3D object, wherein said final 3D object is said 3D object after printing.

11. The system of claim 10, further comprising one or more sensors configured to collect said at least one measured parameter.

12. The system of claim 11, wherein said one or more sensors is selected from the group consisting of an electronic force meter, a barometer, a gas meter, a thermometer, a voltmeter, a multimeter, a camera, and an X-ray unit.

13. The system of claim 10, wherein said one or more computer processors are individually or collectively configured to process said at least one measured parameter using an image analysis of deposited material.

\* \* \* \* \*